(12) United States Patent
Ito et al.

(10) Patent No.: US 12,340,462 B2
(45) Date of Patent: Jun. 24, 2025

(54) WEARABLE TERMINAL DEVICE, PROGRAM, AND DISPLAY METHOD

(71) Applicant: KYOCERA Corporation, Kyoto (JP)

(72) Inventors: Shingo Ito, Kyoto (JP); Tomokazu Adachi, Yokohama (JP); Kai Shimizu, Yokohama (JP)

(73) Assignee: KYOCERA Corporation, Kyoto (JP)

(*) Notice: Subject to any disclaimer, the term of this patent is extended or adjusted under 35 U.S.C. 154(b) by 0 days.

(21) Appl. No.: 18/551,560

(22) PCT Filed: Mar. 25, 2021

(86) PCT No.: PCT/JP2021/012553
§ 371 (c)(1),
(2) Date: Sep. 20, 2023

(87) PCT Pub. No.: WO2022/201430
PCT Pub. Date: Sep. 29, 2022

(65) Prior Publication Data
US 2024/0169659 A1    May 23, 2024

(51) Int. Cl.
*G06T 15/20* (2011.01)
*G06F 3/01* (2006.01)
*G06T 19/00* (2011.01)

(52) U.S. Cl.
CPC ........... *G06T 15/20* (2013.01); *G06F 3/013* (2013.01); *G06T 19/006* (2013.01); *G06F 3/017* (2013.01); *G06T 2219/028* (2013.01)

(58) Field of Classification Search
CPC ........... G06F 3/011; G06F 3/013; G06F 3/017
See application file for complete search history.

(56) References Cited

U.S. PATENT DOCUMENTS

| | | | |
|---|---|---|---|
| 2002/0114508 A1* | 8/2002 | Love | G06V 40/30 382/199 |
| 2012/0092328 A1* | 4/2012 | Flaks | G06V 20/10 345/419 |
| 2013/0265217 A1* | 10/2013 | Sakaguchi | G06F 3/0383 345/156 |
| 2019/0005727 A1* | 1/2019 | Tanaka | G06V 20/588 |
| 2019/0087021 A1 | 3/2019 | Balan et al. | |
| 2019/0340822 A1 | 11/2019 | Ernst et al. | |
| 2019/0369395 A1* | 12/2019 | Ohyama | G03B 21/28 |
| 2021/0097915 A1* | 4/2021 | Yamazaki | G09G 5/006 |
| 2022/0172439 A1* | 6/2022 | Takamizawa | G06T 19/006 |
| 2024/0176459 A1* | 5/2024 | Ito | G06F 3/0486 |
| 2024/0201502 A1* | 6/2024 | Ito | G06F 3/01 |
| 2024/0288931 A1* | 8/2024 | Ito | G02B 27/0101 |
| 2024/0288948 A1* | 8/2024 | Adachi | G02B 27/0101 |

* cited by examiner

*Primary Examiner* — Van N Chow
(74) *Attorney, Agent, or Firm* — Studebaker Brackett PLLC (57) ABSTRACT

A wearable terminal device is configured to be used by being worn by a user. The wearable terminal device includes at least one processor. The at least one processor causes a display to display a virtual image that is located inside a space and has a first surface and a second surface on an opposite side from the first surface. The at least one processor determines whether the first surface or the second surface is easier for the user to see. When the second surface is determined to be easier to see, the at least one processor causes an image of the first surface of the virtual image to be displayed on the second surface of the virtual image.

14 Claims, 6 Drawing Sheets

WEARABLE TERMINAL DEVICE, PROGRAM, AND DISPLAY METHOD

TECHNICAL FIELD

The present disclosure relates to a wearable terminal device, a program, and a display method.

BACKGROUND OF INVENTION

Heretofore, virtual reality (VR), mixed reality (MR), and augmented reality (AR) are known technologies that allow a user to experience virtual images and/or virtual spaces by using a wearable terminal device that is worn on the head of the user. A wearable terminal device includes a display that covers the field of view of the user when worn by the user. Virtual images and/or virtual spaces are displayed on this display in accordance with the position and orientation of the user in order to achieve a visual effect in which the virtual images and/or virtual spaces appear to actually exist (for example, specification of U.S. Patent Application Publication No. 2019/0087021 and specification of U.S. Patent Application Publication No. 2019/0340822).

MR is a technology that allows users to experience a mixed reality in which a real space and virtual images are merged together by displaying virtual images that appear to exist at prescribed positions in the real space while the user sees the real space. VR is a technology that allows a user to feel as though he or she is in a virtual space by allowing him or her to see a virtual space instead of a real space in MR.

Virtual images displayed in VR and MR have display positions defined in the space in which the user is located, and the virtual images are displayed on the display and are visible to the user when the display positions are within a visible area for the user.

SUMMARY

A wearable terminal device of the present disclosure is configured to be used by being worn by a user. The wearable terminal device includes at least one processor. The at least one processor causes a display to display a virtual image that is located inside a space and has a first surface and a second surface on an opposite side from the first surface. The at least one processor determines whether the first surface or the second surface is easier for the user to see. When the second surface is determined to be easier to see, the at least one processor causes an image of the first surface of the virtual image to be displayed on the second surface of the virtual image.

A program of the present disclosure is configured to cause a computer to cause a display to display a virtual image that is located inside a space and has a first surface and a second surface on an opposite side from the first surface, the wearable terminal device provided in a wearable terminal device and configured to be used by being worn by a user. The program causes the computer to determine whether the first surface or the second surface is easier for the user to see. When the second surface is determined to be easier to see, the program causes the computer to cause an image of the first surface of the virtual image to be displayed on the second surface of the virtual image.

A display method of the present disclosure is a display method for use in a wearable terminal device configured to be used by being worn by a user. In the display method, a display is caused to display a virtual image that is located inside a space and has a first surface and a second surface on an opposite side from the first surface. In the display method, whether the first surface or the second surface is easier for the user to see is determined. In the display method, when the second surface is determined to be easier to see, an image of the first surface of the virtual image is caused to be displayed on the second surface of the virtual image.

DESCRIPTION OF EMBODIMENTS

Hereafter, embodiments will be described based on the drawings. However, for convenience of explanation, each figure referred to below is a simplified illustration of only the main components that are needed in order to describe the embodiments. Therefore, a wearable terminal device 10 and an information processing apparatus 20 of the present disclosure may include any components not illustrated in the referenced figures.

First Embodiment

Figure 1:
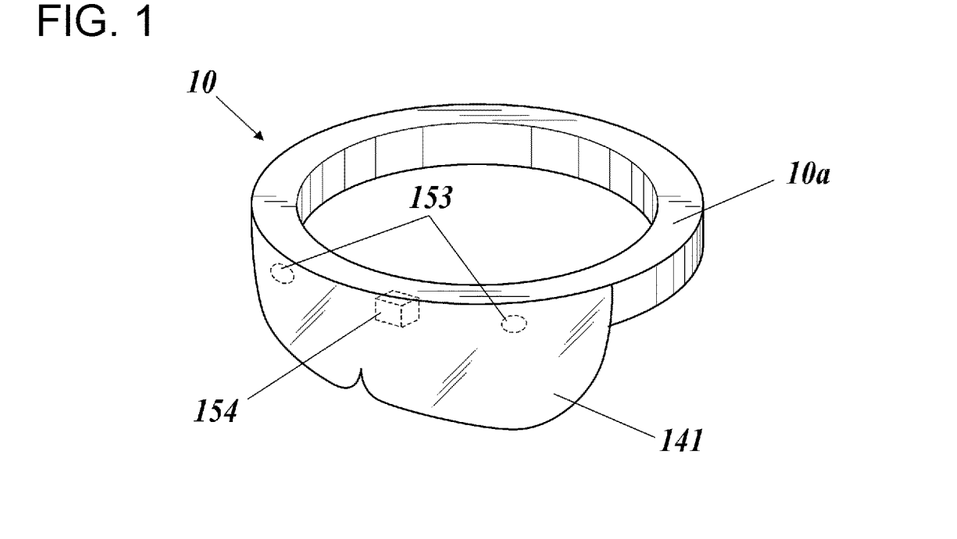
FIG. 1 is a schematic perspective view illustrating the configuration of a wearable terminal device according to a First Embodiment.

As illustrated in FIG. 1, the wearable terminal device 10 includes a body 10a and a visor 141 (display member) attached to the body 10a.

The body 10a is a ring-shaped member whose circumference can be adjusted. Various devices, such as a depth sensor 153 and a camera 154, are built into the body 10a. When the body 10a is worn on the user's head, the user's field of view is covered by the visor 141.

The visor 141 is transparent to light. The user can see a real space through the visor 141. An image such as a virtual image is projected and displayed on a display surface of the visor 141, which faces the user's eyes, from a laser scanner 142 (refer to FIG. 4), which is built into the body 10a. The user sees the virtual image in the form of light reflected from the display surface. At this time, since the user is also viewing the real space through the visor 141, a visual effect is obtained as though the virtual image exists in the real space.

Figure 2:
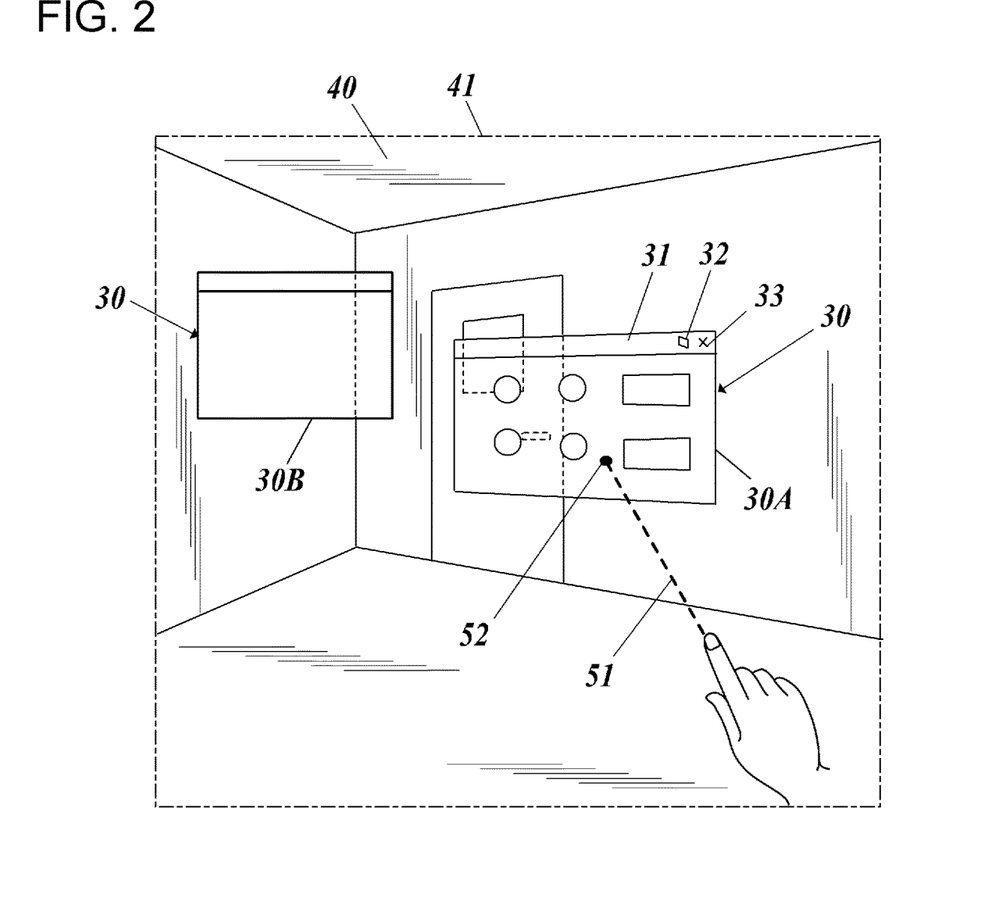
FIG. 2 illustrates an example of a visible area and a virtual image seen by a user wearing a wearable terminal device.

As illustrated in FIG. 2, with virtual images 30 displayed, the user sees the virtual images 30 at prescribed positions in a space 40 with the virtual images 30 facing in prescribed directions. In this embodiment, the space 40 is the real space that the user sees through the visor 141. The virtual images 30 are projected onto a light-transmissive visor 141 so as to be seen as translucent images superimposed on the real space. In FIG. 2, an example is illustrated in which the virtual images 30 are flat window screens, but the virtual images 30 are not limited to being flat window screens, and may be objects such as arrows or various three-dimensional images. If the virtual images 30 are window screens, the virtual images 30 have front surfaces (first surfaces) 30A and rear surfaces (second surfaces) 30B, and necessary information is displayed on the front surfaces 30A and typically no information is displayed on the rear surfaces 30B. With respect to the virtual images 30 of the window screens, the virtual images 30 may have a thickness within a prescribed range up to a prescribed thickness.

Figure 3:
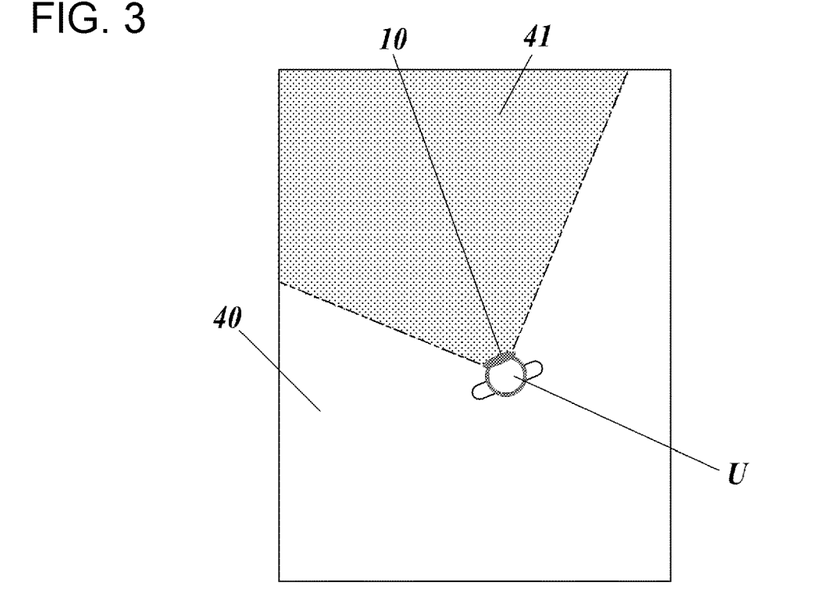
FIG. 3 is a diagram for explaining a visible area in space.

The wearable terminal device 10 detects a visible area 41 for the user based on the position and orientation of the user in the space 40 (in other words, the position and orientation of the wearable terminal device 10). As illustrated in FIG. 3, the visible area 41 is the area of the space 40 that is located in front of a user U wearing the wearable terminal device 10. For example, the visible area 41 is an area within a prescribed angular range from the front of user U in the left-right directions and up-down directions. In this case, a cross section obtained when a three-dimensional object corresponding to the shape of the visible area 41 is cut along a plane perpendicular to the frontal direction of the user U is rectangular. The shape of the visible area 41 may be defined so that the cross section has a shape other than a rectangular shape (for example, a circular or oval shape). The shape of the visible area 41 (for example, the angular range from the front in left-right directions and up-down directions) can be specified for example using the following method.

In the wearable terminal device 10, the field of view is adjusted (hereinafter referred to as "calibrated") in a prescribed procedure at a prescribed timing, such as when the device is first started up. In this calibration, the area that can be seen by the user identified, and the virtual images 30 are displayed within that area thereafter. The shape of the visible area 41 can be set as the shape of the visible area identified by this calibration.

Calibration is not limited to being performed using the prescribed procedure described above, and calibration may be performed automatically during normal operation of the wearable terminal device 10. For example, if the user does not react to a display that the user is supposed to react to, the field of view (and the shape of the visible area 41) may be adjusted while assuming that the area where the display is performed is outside the user's field of view. The field of view (and the shape of the visible area 41) may be adjusted by performing display on a trial basis at a position that is defined as being outside the range of the field of view, and if the user does react to the display, the area where the display is performed may be considered as being within the range of the user's field of view.

The shape of the visible area 41 may be determined in advance and fixed at the time of shipment or the like and not based on the result of adjustment of the field of view. For example, the shape of the visible area 41 may be defined by the optical design of a display 14 to the maximum extent possible.

The virtual images 30 are generated in accordance with prescribed operations performed by the user with display positions and orientations defined in the space 40. Out of the generated virtual images 30, the wearable terminal device 10 displays the virtual images 30 whose display positions are defined inside the visible area 41 by projecting the virtual images 30 onto the visor 141. In FIG. 2, the visible area 41 is represented by a chain line.

The display positions and orientations of the virtual images 30 on the visor 141 are updated in real time in accordance with changes in the visible area 41 for the user. In other words, the display positions and orientations of the virtual images 30 change in accordance with changes in the visible area 41 so that the user perceives that "the virtual images 30 are located within the space 40 at set positions and with set orientations". For example, as the user moves from the front sides to the rear sides of the virtual images 30, the shapes (angles) of the displayed virtual images 30 gradually change in accordance with this movement. When the user moves around to the rear side of a virtual image 30 and then turns toward the virtual image 30, the rear surface 30B of the virtual image 30 is displayed so that the user can see the rear surface 30B. In accordance with changes in the visible area 41, the virtual images 30 whose display positions have shifted out of the visible area 41 are no longer displayed, and if there are any virtual images 30 whose display positions have now entered the visible area 41, those virtual images 30 are newly displayed.

As illustrated in FIG. 2, when the user holds his or her hand (or finger) forward, the direction in which the hand is extended is detected by the wearable terminal device 10, and a virtual line 51 extending in that direction and a pointer 52 are displayed on the display surface of the visor 141 for the user to see. The pointer 52 is displayed at the intersection of the virtual line 51 and a virtual image 30. If the virtual line 51 does not intersect any virtual image 30, the pointer 52 may be displayed at the intersection of the virtual line 51 and a wall of the space 40 or the like. When the distance between the hand of the user and the virtual image 30 is within a prescribed reference distance, the pointer 52 may be directly displayed at a position corresponding to the finger tip of the user without displaying the virtual line 51.

The user can adjust the direction of the virtual line 51 and the position of the pointer 52 by changing the direction in which the user extends his or her hand. When a prescribed gesture is performed with the pointer 52 adjusted so as to be positioned at a prescribed operation target (for example, a function bar 31, a window shape change button 32, or a close button 33) included in the virtual image 30, the gesture can be detected by the wearable terminal device 10 and a prescribed operation can be performed on the operation target. For example, with the pointer 52 aligned with the close button 33, the virtual image 30 can be closed (deleted) by performing a gesture for selecting an operation target (for example, a pinching gesture made using the fingertips). The virtual image 30 can be moved in the depth direction and in left-right directions by making a selection gesture with the pointer 52 aligned with the function bar 31, and then making a gesture of moving the hand back and forth and left and right while maintaining the selection gesture. Operations that can be performed on the virtual images 30 are not limited to these examples.

Thus, the wearable terminal device 10 of this embodiment can realize a visual effect as though the virtual images 30 exist in the real space, and can accept user operations performed on the virtual images 30 and reflect these operations in the display of the virtual images 30. In other words, the wearable terminal device 10 of this embodiment provides MR.

Next, the functional configuration of the wearable terminal device 10 will be described while referring to FIG. 4. The wearable terminal device 10 includes a central processing unit (CPU) 11, a random access memory (RAM) 12, a storage unit 13, the display 14, a sensor unit 15, and a communication unit 16, and these components are connected to each other by a bus 17. Each of the components illustrated in FIG. 4, except for the visor 141 of the display 14, is built into the body 10a and operates with power supplied from a battery, which is also built into the body 10a.

The CPU 11 is a processor that performs various arithmetic operations and performs overall control of the operations of the various parts of the wearable terminal device 10. The CPU 11 reads out and executes a program 131 stored in storage unit 13 in order to perform various control operations. The CPU 11 executes the program 131 in order to perform, for example, visible area detection processing and display control processing. Among these processing operations, the visible area detection processing is processing for detecting the visible area 41 for the user inside the space 40. The display control processing is processing for causing the display 14 to display the virtual images 30 whose positions are defined inside the visible area 41 from among the virtual images 30 whose positions are defined in the space 40.

Figure 4:
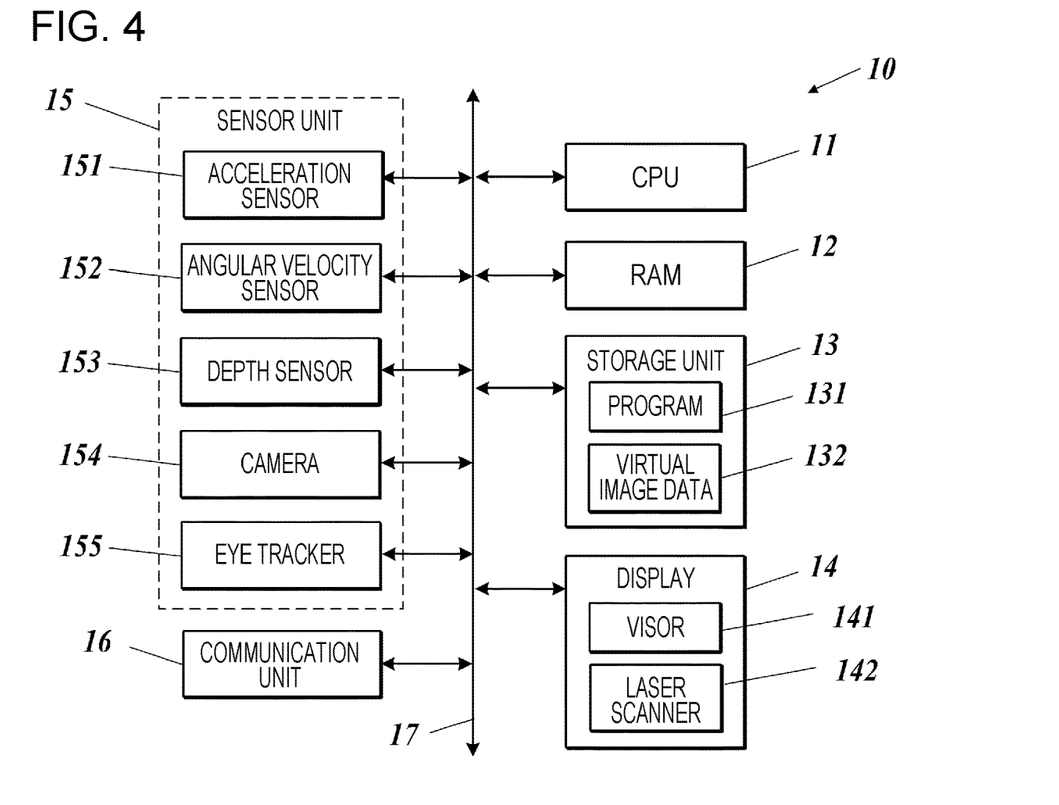
FIG. 4 is a block diagram illustrating the main functional configuration of the wearable terminal device.

A single CPU 11 is illustrated in FIG. 4, but the configuration is not limited to a single CPU 11. Two or more processors, such as CPUs, may be provided, and these two or more processors may share the processing performed by the CPU 11 in this embodiment.

The RAM 12 provides a working memory space for the CPU 11 and stores temporary data.

The storage unit 13 is a non-transitory recording medium that can be read by the CPU 11 serving as a computer. The storage unit 13 stores the program 131 executed by the CPU 11 and various settings data. The program 131 is stored in storage unit 13 in the form of computer-readable program code. For example, a nonvolatile storage device such as a solid state drive (SSD) including a flash memory can be used as the storage unit 13.

The data stored in storage unit 13 includes virtual image data 132 relating to virtual images 30. The virtual image data 132 includes data relating to display content of the virtual images 30 (for example, image data), display position data, and orientation data.

The display 14 includes the visor 141, the laser scanner 142, and an optical system that directs light output from the laser scanner 142 to the display surface of the visor 141. The laser scanner 142 irradiates the optical system with a pulsed laser beam, which is controlled so as to be switched on and off for each pixel, while scanning the beam in prescribed directions in accordance with a control signal from the CPU 11. The laser light incident on the optical system forms a display screen composed of a two-dimensional pixel matrix on the display surface of the visor 141. The method employed by the laser scanner 142 is not particularly limited, but for example, a method in which the laser light is scanned by operating a mirror using micro electro mechanical systems (MEMS) can be used. The laser scanner 142 includes three light-emitting units that emit laser light in colors of RGB, for example. The display 14 can perform color display by projecting light from these light-emitting units onto the visor 141.

The sensor unit 15 includes an acceleration sensor 151, an angular velocity sensor 152, the depth sensor 153, the camera 154, and an eye tracker 155. The sensor unit 15 may further include sensors that are not illustrated in FIG. 4.

The acceleration sensor 151 detects the acceleration and outputs the detection results to the CPU 11. From the detection results produced by the acceleration sensor 151, translational motion of the wearable terminal device 10 in directions along three orthogonal axes can be detected.

The angular velocity sensor 152 (gyro sensor) detects the angular velocity and outputs the detection results to the CPU 11. The detection results produced by the angular velocity sensor 152 can be used to detect rotational motion of the wearable terminal device 10.

The depth sensor 153 is an infrared camera that detects the distance to a subject using the time of flight (ToF) method, and outputs the distance detection results to the CPU 11. The depth sensor 153 is provided on a front surface of the body 10a such that images of the visible area 41 can be captured. The entire space 40 can be three-dimensionally mapped (i.e., a three-dimensional structure can be acquired) by repeatedly performing measurements using the depth sensor 153 each time the position and orientation of the user change in the space 40 and then combining the results.

The camera 154 captures images of the space 40 using a group of RGB imaging elements, acquires color image data as results of the image capturing, and outputs the results to the CPU 11. The camera 154 is provided on the front surface of the body 10a so that images of the visible area 41 can be captured. The images output from the camera 154 are used to detect the position, orientation, and so on of the wearable terminal device 10, and are also transmitted from the communication unit 16 to an external device and used to display the visible area 41 for the user of the wearable terminal device 10 on the external device.

The eye tracker 155 detects the user's line of sight and outputs the detection results to the CPU 11. The method used for detecting the line of sight is not particularly limited, but for example, a method can be used in which an eye tracking camera is used to capture images of the reflection points of near-infrared light in the user's eyes, and the results of that image capturing and the images captured by the camera 154 are analyzed in order to identify a target being looked at by the user. Part of the configuration of the eye tracker 155 may be provided in or on a peripheral portion of the visor 141, for example.

The communication unit 16 is a communication module that includes an antenna, a modulation-demodulation circuit, and a signal processing circuit. The communication unit 16 transmits and receives data via wireless communication with external devices in accordance with a prescribed communication protocol.

In the wearable terminal device 10 having the above-described configuration, the CPU 11 performs the following control operations.

The CPU 11 performs three-dimensional mapping of the space 40 based on distance data to a subject input from the depth sensor 153. The CPU 11 repeats this three-dimensional mapping whenever the position and orientation of the user change, and updates the results each time. The CPU 11 also performs three-dimensional mapping for each connected space 40 serving as a unit. Therefore, when the user moves between multiple rooms that are partitioned from each other by walls and so on, the CPU 11 recognizes each room as a single space 40 and separately performs three-dimensional mapping for each room.

The CPU 11 detects the visible area 41 for the user in the space 40. In detail, the CPU 11 identifies the position and orientation of the user (wearable terminal device 10) in the space 40 based on detection results from the acceleration sensor 151, the angular velocity sensor 152, the depth sensor 153, the camera 154, and the eye tracker 155, and accumulated three-dimensional mapping results. The visible area 41 is then detected (identified) based on the identified position and orientation and the predetermined shape of the visible area 41. The CPU 11 continuously detects the position and orientation of the user in real time, and updates the visible area 41 in conjunction with changes in the position and orientation of the user. The visible area 41 may be detected using detection results from some of the components out of the acceleration sensor 151, the angular velocity sensor 152, the depth sensor 153, the camera 154, and the eye tracker 155.

The CPU 11 generates the virtual image data 132 relating to the virtual images 30 in accordance with operations performed by the user. In other words, upon detecting a prescribed operation (gesture) instructing generation of a virtual image 30, the CPU 11 identifies the display content (for example, image data), display position, and orientation of the virtual image, and generates virtual image data 132 including data representing these specific results.

The CPU 11 causes the display 14 to display virtual images 30 whose display positions are defined inside the visible area 41. The CPU 11 identifies virtual images 30 whose display position are defined inside the visible area 41 based on the information of the display position included in the virtual image data 132, and generates image data of a display screen to be displayed on the display 14 based on the positional relationship between the visible area 41 and the display positions of the identified virtual images 30 at that point in time. The CPU 11 causes the laser scanner 142 to perform a scanning operation based on this image data in order to form a display screen containing the identified virtual images 30 on the display surface of the visor 141. In other words, the CPU 11 causes the virtual images 30 to be displayed on the display surface of the visor 141 so that the virtual images 30 are visible in the space 40 seen through the visor 141. By continuously performing this display control processing, the CPU 11 updates the display contents displayed on the display 14 in real time so as to match the user's movements (changes in the visible area 41). If the wearable terminal device 10 is set up to continue holding the virtual image data 132 even after the wearable terminal device 10 is turned off, the next time the wearable terminal device 10 is turned on, the existing virtual image data 132 is read and if there are virtual images 30 located inside the visible area 41, these virtual images 30 are displayed on the display 14.

The virtual image data 132 may be generated based on instruction data acquiring from an external device via the communication unit 16, and virtual images 30 may be displayed based on this virtual image data 132. Alternatively, the virtual image data 132 itself may be acquired from an external device via the communication unit 16 and virtual images 30 may be displayed based on the virtual image data 132. For example, an image captured by the camera 154 of the wearable terminal device 10 may be displayed on an external device operated by a remote instructor, an instruction to display the virtual image 30 may be accepted from the external device, and the instructed virtual image 30 may be displayed on the display 14 of the wearable terminal device 10. This makes it possible, for example, for a remote instructor to instruct a user of the wearable terminal device 10 in how to perform a task by displaying a virtual image 30 illustrating the work to be performed in the vicinity of a work object.

The CPU 11 detects the position and orientation of the user's hand (and/or fingers) based on images captured by the depth sensor 153 and the camera 154, and causes the display 14 to display a virtual line 51 extending in the detected direction and the pointer 52. The CPU 11 detects a gesture made by the user's hand (and/or fingers) based on images captured by the depth sensor 153 and the camera 154, and performs processing in accordance with the content of the detected gesture and the position of the pointer 52 at that time.

Next, operation of the wearable terminal device 10 performed when a virtual image 30 of window screen is present inside the visible area 41 will be described.

As mentioned above, normally, information is not displayed on the rear surface 30B of a virtual image 30 of a window screen. Therefore, if the virtual image 30 is displayed inside the visible area 41 with the front surface 30A not visible, i.e., with the rear surface 30B facing in a direction towards the user, the user will not be able to recognize what is illustrated in this virtual image 30. Therefore, the user will be inconvenienced by needing to move around to the front side of the virtual image 30 in order to check the information displayed on the front surface 30A of the virtual image 30. Therefore, heretofore, with the objective of allowing information displayed on the front surface 30A to be viewed without the user needing to move around to the front side of the virtual image 30, a technology has been disclosed for reversing the front surface 30A and rear surface 30B of the virtual image 30 by performing a prescribed gesture while the pointer 52 is aligned with a prescribed area of the rear surface 30B of the virtual image 30, specifically, the area corresponding to the area of the front surface 30A where the function bar 31 is displayed. However, there is an issue with this technology in that performing the operation of reversing the front surface 30A and rear surface 30B of the virtual image 30 as described above is difficult because the prescribed area is small and aligning the pointer 52 with the prescribed area is difficult. In particular, when a virtual image 30 is located at the far end of the visible area 41, the size of the virtual image 30 becomes smaller, and this issue becomes more pronounced.

Therefore, the CPU 11 of the wearable terminal device 10 in this embodiment determines whether the front surface 30A or the rear surface 30B of the virtual image 30 of the window screen is easier for the user to see. If the rear surface 30B is determined to be easier to see, the CPU 11 causes an image of the front surface 30A of the virtual image 30 to be displayed on the rear surface 30B of the virtual image 30. This allows the user to view the information displayed on the front surface 30A of the virtual image 30 without needing to move around to the front side of the virtual image 30 and without needing to perform an operation in order to cause an image of the front surface 30A to be displayed on the rear surface 30B of the virtual image 30. Next, an example of control performed in order to display an image of the front surface 30A on the rear surface 30B of the virtual image 30 of a window screen will be described while referring to FIGS. 5 to 9.

First, a control procedure performed by the CPU 11 for virtual image display processing according to an aspect of the present disclosure will be described while referring to the flowchart in FIG. 5. The virtual image display processing in FIG. 5 includes at least a feature of causing an image of the front surface 30A to be displayed on the rear surface 30B of the virtual image 30 when the rear surface 30B of the virtual image 30 of the window screen is determined to be easier for the user to see.

Figure 5:
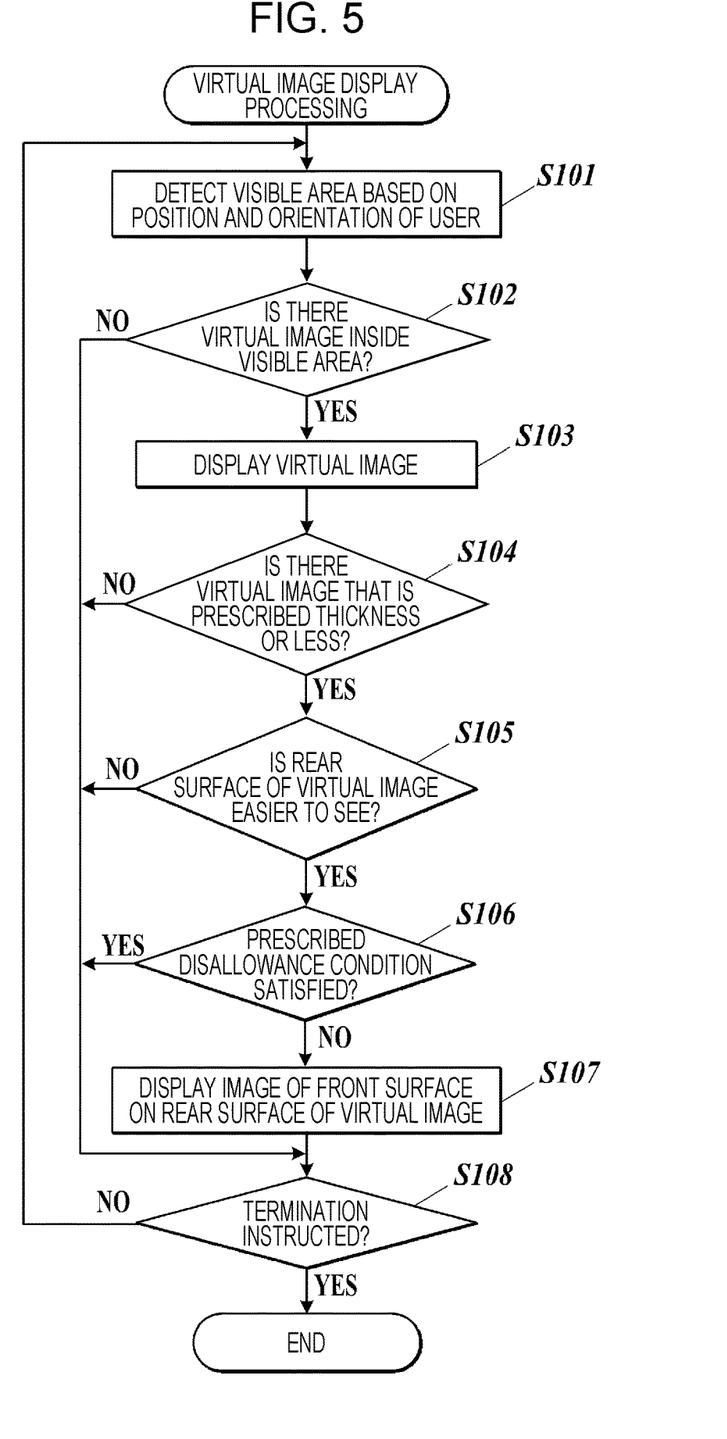
FIG. 5 is a flowchart illustrating the control procedure of virtual image display processing.

When the virtual image display processing illustrated in FIG. 5 starts, the CPU 11 detects the visible area 41 based on the position and orientation of the user (Step S101).

Next, the CPU 11 determines whether there is a virtual image 30 whose display position is defined inside the detected visible area 41 (Step S102).

When there is determined to be no virtual image 30 whose display position is defined inside the detected visible area 41 in Step S102 (Step S102; NO), the CPU 11 advances the processing to Step S108.

When there is determined to be a virtual image 30 whose display position is defined inside the detected visible area 41 in Step S102 (Step S102; YES), the CPU 11 causes the virtual image 30 to be displayed on the display 14 (Step S103).

Next, the CPU 11 determines whether or not, out of the virtual images 30 displayed on the display 14, there is a virtual image 30 that is a prescribed thickness or less, that is, whether or not there is a virtual image 30 of a window screen (Step S104).

When there are determined to be no virtual images 30 displayed on the display 14 that are the prescribed thickness or less in Step S104 (Step S104; NO), the CPU 11 advances the processing to Step S108. In other words, for a three-dimensional virtual image 30 that exceeds the prescribed thickness, the processing of Step S106 described below is skipped, and an image of the front surface (front) is not displayed on the rear surface (back) of the virtual image 30. In the case of a three-dimensional virtual image 30 (for example, a virtual image of a car), this may be because the user wants to look at the rear side of the virtual image 30.

In Step S104, when there is determined to be a virtual image 30 of a prescribed thickness or less, out of the virtual images 30 displayed on the display 14, i.e., there is a virtual image 30 of a window screen (Step S104; YES), the CPU 11 determines whether the rear surface 30B of this virtual image 30 is easier for the user to see (Step S105).

Next, a method of determining whether the front surface 30A or the rear surface 30B of the virtual image 30 of a window screen is easier for the user to see will be described.

Figure 6:
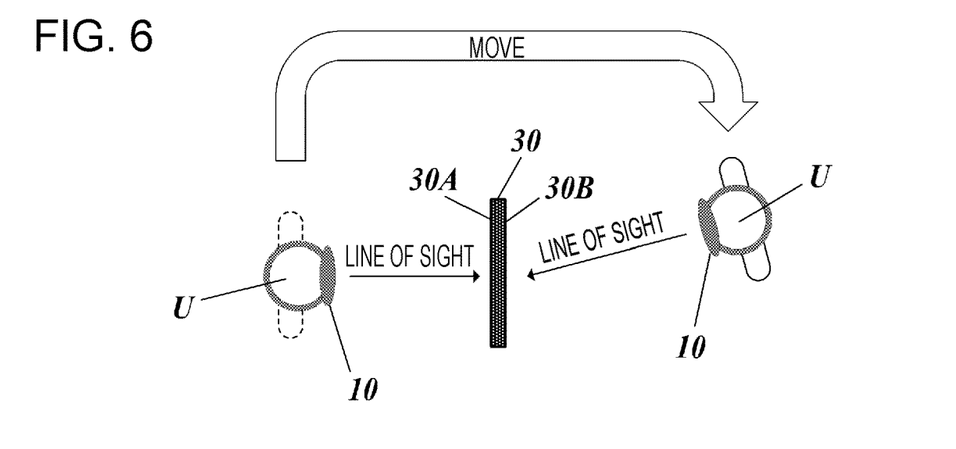
FIG. 6 is a diagram for explaining a method of determining whether the front surface or the rear surface of a virtual image of a window screen is easier for a user to see.

As a first determination method, for example, as illustrated in FIG. 6, when the user U is at a position facing the front surface 30A of the virtual image 30 of a window screen, and the intersection between the line of sight of the user U detected by the eye tracker 155 and the virtual image 30 is on the front surface 30A side of the virtual image 30, the CPU 11 determines that the front surface 30A of the virtual image 30 is easier for the user U to see. On the other hand, for example, if the user U has moved around from the front surface 30A side to the rear surface 30B side of the virtual image 30, and the intersection of the line of sight of the user U detected by the eye tracker 155 and the virtual image 30 is on the rear surface 30B side of the virtual image 30, the CPU 11 determines that the rear surface 30B of the virtual image 30 is easier for the user U to see. In this way, the determination can be accurately made. The determination method used is not limited to the above-described method, and a second determination method and a third determination method described below may be employed.

Figure 7:
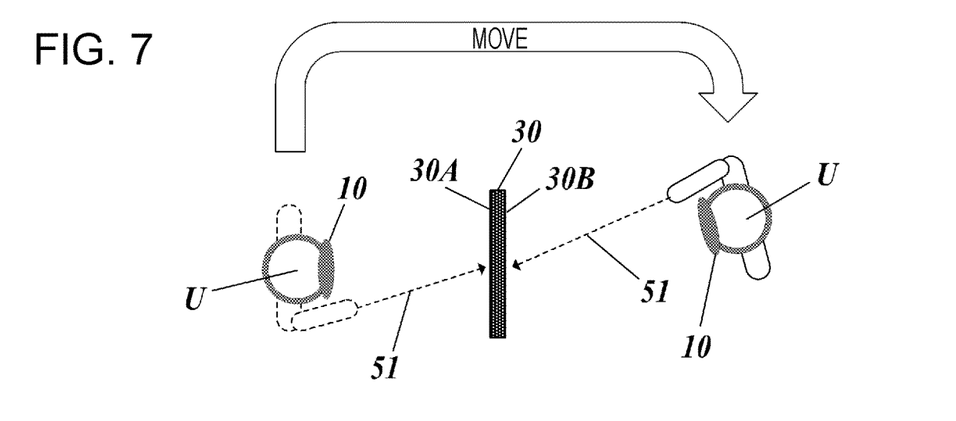
FIG. 7 is a diagram for explaining a method of determining whether the front surface or the rear surface of a virtual image of a window screen is easier for a user to see.

As a second determination method, for example, as illustrated in FIG. 7, when the user U is at a position facing the front surface 30A of the virtual image 30 of a window screen, and the intersection between the virtual line 51 extending in the direction in which the user extends his or her hand and the virtual image 30 is on the front surface 30A side of the virtual image 30, the CPU 11 determines that the front surface 30A of the virtual image 30 is easier for the user U to see. On the other hand, for example, if the user U has moved around from the front surface 30A side to the rear surface 30B side of the virtual image 30, and the intersection between the virtual line 51 extending in the direction in which the user extends his or her hand and the virtual image 30 is on the rear surface 30B side of the virtual image 30, the CPU 11 determines that the rear surface 30B of the virtual image 30 is easier for the user U to see. In this way, the determination can be accurately made.

Figure 8:
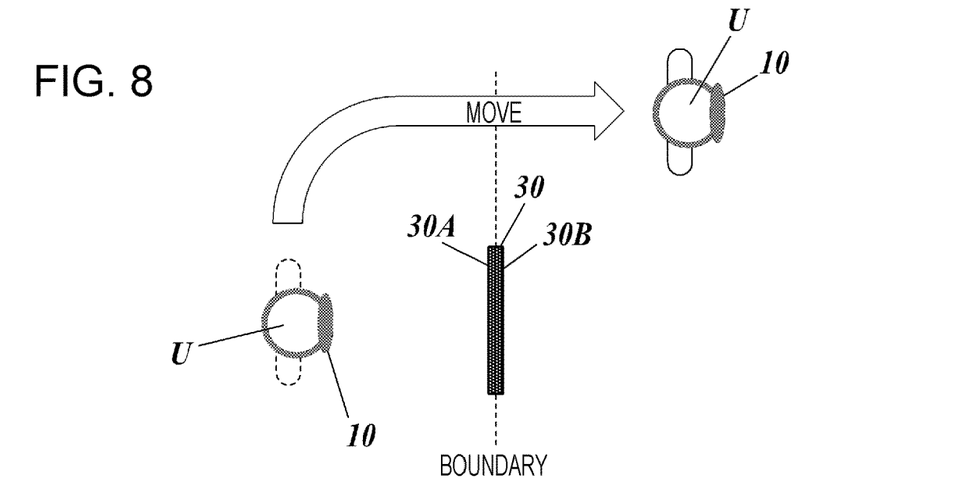
FIG. 8 is a diagram for explaining a method of determining whether the front surface or the rear surface of a virtual image of a window screen is easier for a user to see.

As illustrated in FIG. 8, for example, as a third determination method, when the user U is at a position facing the surface 30A of the virtual image 30 of a window screen, that is, when the user U is located on the front surface 30A side with respect to the boundary between the front surface 30A and the rear surface 30B, the CPU 11 determines that the front surface 30A of the virtual image 30 is easier for the user U to see. On the other hand, if, for example, the user U has crossed the boundary of the virtual image 30 and moved from the front surface 30A side to the rear surface 30B side and is now located on the rear surface 30B side with respect to the boundary, regardless of whether or not the user U is looking at the rear surface 30B of the virtual image 30, the CPU 11 determines that the rear surface 30B of the virtual image 30 is easier for the user U to see. In this way, the determination can be accurately made.

Returning to the description of the control procedure of the virtual image display processing, if the rear surface 30B of the virtual image 30 is determined to be not easier for the user to see in Step S105 (Step S105; NO), the CPU 11 advances the processing to Step S108.

If the rear surface 30B of the virtual image 30 is determined to be easier for the user to see in Step S105 (Step S105; YES), the CPU 11 determines whether or not a prescribed disallowance condition is satisfied (Step S106).

Figure 9:
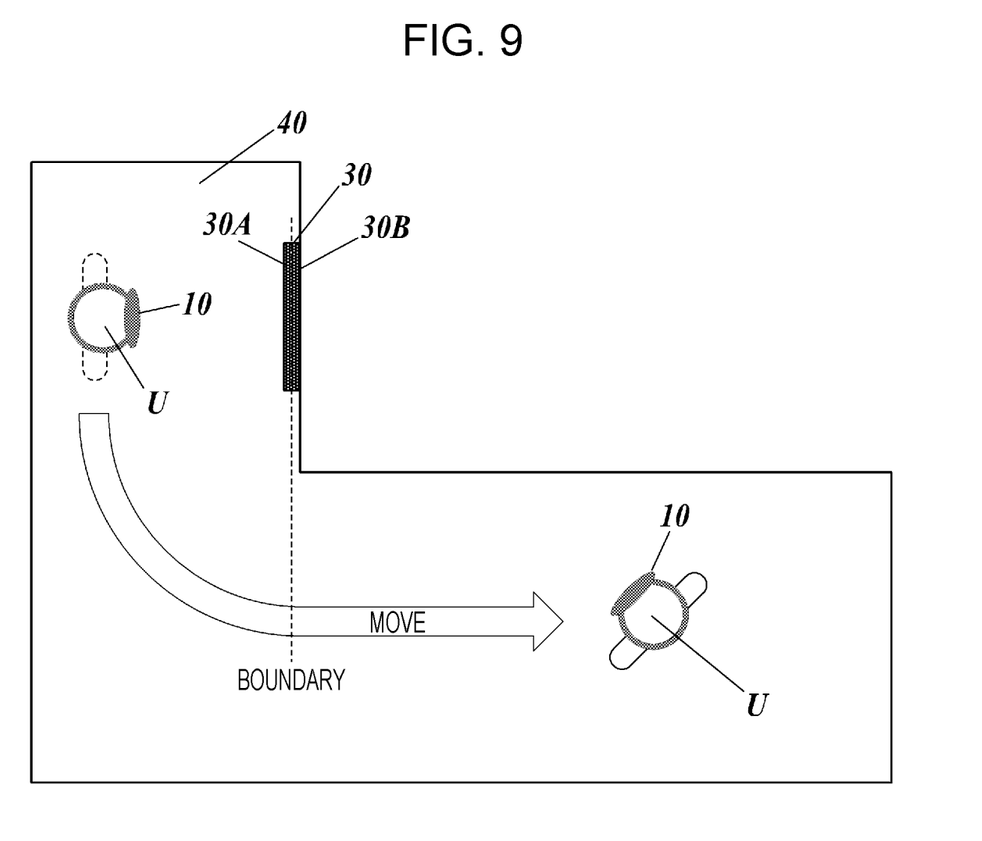
FIG. 9 is a diagram illustrating an example in which an image of the front surface of the virtual image is not displayed on the rear surface of the virtual image of the window screen.

Here, the prescribed disallowance condition is, for example, as illustrated in FIG. 9, that at least either the virtual image 30, whose rear surface 30B is determined to be easier to see, is located at a position within a prescribed distance from an actual wall inside the space 40, or there is an obstacle (such as a wall) between the user U who is located on the rear surface 30B side relative to the border between the front surface 30A and the rear surface 30B, the obstacle blocking the virtual image 30 from being viewed. The prescribed distance appearing in the disallowance condition is taken to be a distance of such a size that the user U would be unable to enter the space between the virtual image 30 and the wall.

In response to a prescribed operation performed by the user, the virtual image 30 of a window screen may be set to either of a first mode in which display of an image of the front surface 30A of the virtual image 30 on the rear surface 30B of the virtual image 30 is allowed, and a second mode in which this type of display is not allowed. In such a case, the disallowance condition described above includes a virtual image 30 whose rear surface 30B is determined to be easier to see being set to the second mode.

When the prescribed disallowance condition is determined to be satisfied in Step S106 (Step S106; YES), the CPU 11 advances the processing to Step S108. Therefore, as described above, if there is a virtual image 30, whose rear surface 30B is determined to be easier to see, at a position within a prescribed distance from an actual wall inside the space 40, or if there is an obstacle (for example, a wall)

between the virtual image 30 and the user U located on the rear surface 30B side with respect to the boundary between the front surface 30A and the rear surface 30B, the obstacle blocking viewing of the virtual image 30, the prescribed disallowance condition is satisfied, and an image of the front surface 30A is not displayed on the rear surface 30B of the virtual image 30.

When the prescribed disallowance condition is determined not to be satisfied in Step S106 (Step S106; NO), the CPU 11 causes an image of the front surface 30A to be displayed on the rear surface 30B of the virtual image 30 whose rear surface 30B is easier to see (Step S107).

In the processing of Step S107, when causing an image of the front surface 30A to be displayed on the rear surface 30B of the virtual image 30, an image of the rear surface 30B may be displayed on the front surface 30A, that is, an image of the front surface 30A and an image of the rear surface 30B of the virtual image 30 may be swapped with each other. In such a case, if, after swapping and displaying the images as described above, the user moves around to the front side of the virtual image 30 and the front surface 30A of the virtual image 30 is determined to be easier to see, the CPU 11 may then swap the image of the front surface 30A and the image of the rear surface 30B of the virtual image 30 again and display the images.

Next, the CPU 11 determines whether or not an instruction to terminate the display operation performed by the wearable terminal device 10 has been issued (Step S108).

When an instruction to terminate the display operation performed by the wearable terminal device 10 is determined not to have been issued in Step S108 (Step S108; NO), the CPU 11 returns the processing to Step S101 and repeats the subsequent processing.

When an instruction to terminate the display operation performed by the wearable terminal device 10 is determined to have been issued in Step S108 (Step S108; YES), the CPU 11 terminates the virtual image display processing.

Second Embodiment

Next, the configuration of a display system 1 according to a Second Embodiment will be described. The Second Embodiment differs from the First Embodiment in that an external information processing apparatus 20 executes part of the processing that is executed by the CPU 11 of the wearable terminal device 10 in the First Embodiment. Hereafter, differences from the First Embodiment will be described, and description of common points will be omitted.

Figure 10:
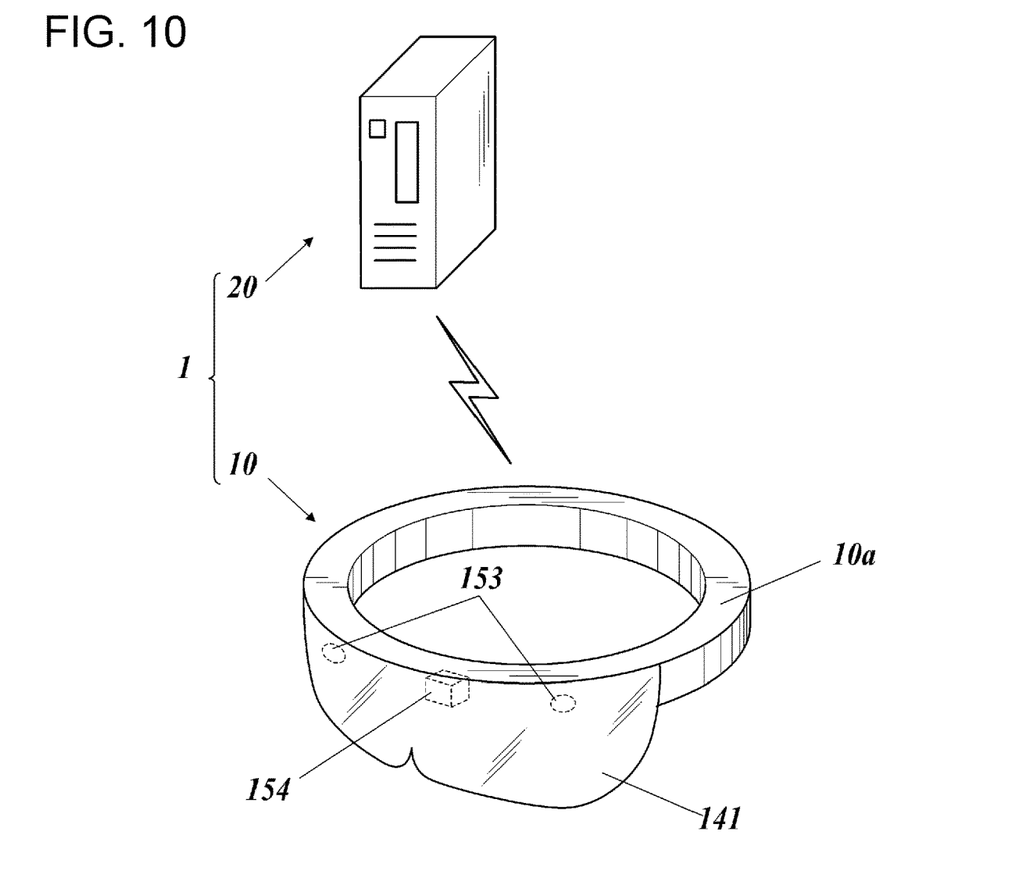
FIG. 10 is a schematic diagram illustrating the configuration of a display system according to a Second Embodiment.

As illustrated in FIG. 10, the display system 1 includes the wearable terminal device 10 and the information processing apparatus 20 (server) connected to the wearable terminal device 10 so as to be able to communicate with the wearable terminal device 10. At least part of a communication path between the wearable terminal device 10 and the information processing apparatus 20 may be realized by wireless communication. The hardware configuration of the wearable terminal device 10 can be substantially the same as in the First Embodiment, but the processor for performing the same processing as that performed by the information processing apparatus 20 may be omitted.

Figure 11:
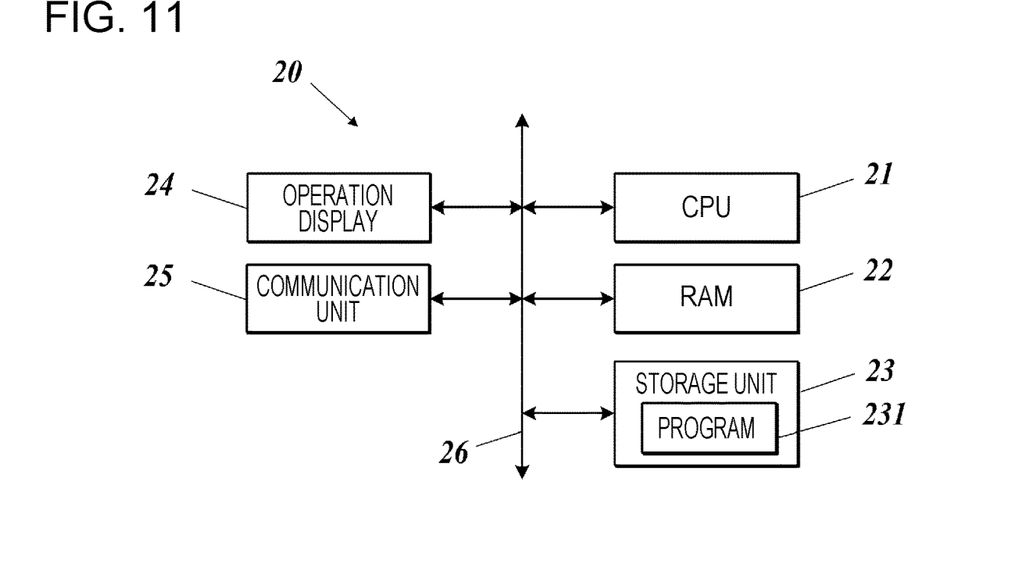
FIG. 11 is a block diagram illustrating the main functional configuration of an information processing apparatus.

As illustrated in FIG. 11, the information processing apparatus 20 includes a CPU 21, a RAM 22, a storage unit 23, an operation display 24, and a communication unit 25, which are connected to each other by a bus 26.

The CPU 21 is a processor that performs various arithmetic operations and controls overall operation of the various parts of the information processing apparatus 20. The CPU 21 reads out and executes a program 231 stored in storage unit 23 in order to perform various control operations.

The RAM 22 provides a working memory space for the CPU 21 and stores temporary data.

The storage unit 23 is a non-transitory recording medium that can be read by the CPU 21 serving as a computer. The storage unit 23 stores the program 231 executed by the CPU 21 and various settings data. The program 231 is stored in storage unit 23 in the form of computer-readable program code. For example, a nonvolatile storage device such as an SSD containing a flash memory or a hard disk drive (HDD) can be used as the storage unit 23.

The operation display 24 includes a display device such as a liquid crystal display and input devices such as a mouse and keyboard. The operation display 24 displays various information about the display system 1, such as operating status and processing results, on the display device. Here, the operating status of the display system 1 may include real-time images captured by the camera 154 of the wearable terminal device 10. The operation display 24 converts operations input to the input devices by the user into operation signals and outputs the operation signals to the CPU 21.

The communication unit 25 communicates with the wearable terminal device 10 and transmits data to and receives data from the wearable terminal device 10. For example, the communication unit 25 receives data including some or all of the detection results produced by the sensor unit 15 of the wearable terminal device 10 and information relating to user operations (gestures) detected by the wearable terminal device 10. The communication unit 25 may also be capable of communicating with devices other than the wearable terminal device 10.

In the thus-configured display system 1, the CPU 21 of the information processing apparatus 20 performs at least part of the processing that the CPU 11 of the wearable terminal device 10 performs in the First Embodiment. For example, the CPU 21 may perform three-dimensional mapping of the space 40 based on detection results from the depth sensor 153. The CPU 21 may detect the visible area 41 for the user in the space 40 based on detection results produced by each part of the sensor unit 15. The CPU 21 may also generate the virtual image data 132 relating to the virtual images 30 in accordance with operations performed by the user of the wearable terminal device 10. The CPU 21 may also detect the position and orientation of the user's hand (and/or fingers) based on images captured by the depth sensor 153 and the camera 154.

The results of the above processing performed by the CPU 21 are transmitted to wearable terminal device 10 via the communication unit 25. The CPU 11 of the wearable terminal device 10 causes the individual parts of the wearable terminal device 10 (for example, display 14) to operate based on the received processing results. The CPU 21 may also transmit control signals to the wearable terminal device 10 in order to control the display 14 of the wearable terminal device 10.

Thus, as a result of executing at least part of the processing in the information processing apparatus 20, the configuration of the wearable terminal device 10 can be simplified and manufacturing costs can be reduced. In addition, using the information processing apparatus 20, which has a higher performance, allows various types of processing related to MR to be made faster and more precise. Thus, the precision of 3D mapping of the space 40 can be increased, the quality of display performed by the display 14 can be improved, and the reaction speed of the display 14 to operations performed by the user can be increased.

Other Considerations

The above embodiments are illustrative examples, and may be changed in various ways.

For example, in each of the above embodiments, the visor 141 that is transparent to light was used to allow the user to see the real space, but this configuration does not necessarily need to be adopted. For example, a visor 141 that blocks light may be used and the user may be allowed to see an image of the space 40 captured by the camera 154. In other words, the CPU 11 may cause the display 14 to display an image of the space 40 captured by the camera 154 and the virtual images 30 superimposed on the image of the space 40. With this configuration, MR, in which the virtual images 30 are merged with the real space, can be realized.

In addition, VR can be realized in which the user is made to feel as though he or she is in a virtual space by using images of a pre-generated virtual space instead of images captured in the real space by the camera 154. In this VR as well, the visible area 41 for the user is identified, and the virtual images 30 whose display positions are defined as being inside the visible area 41 out of the virtual space are displayed.

The wearable terminal device 10 does not need to include the ring-shaped body 10a illustrated in FIG. 1, and may have any structure so long as the wearable terminal device 10 includes a display that is visible to the user when worn. For example, a configuration in which the entire head is covered, such as a helmet, may be adopted. The wearable terminal device 10 may also include a frame that hangs over the ears, like a pair of glasses, with various devices built into the frame.

An example has been described in which the gestures of a user are detected and accepted as input operations, but the present disclosure is not limited to this example. For example, input operations may be accepted by a controller held in the user's hand or worn on the user's body.

In the above embodiments, when a virtual image 30 of a window screen is displayed on the display 14, the front surface 30A and the rear surface 30B at the time of the initial display may be displayed in an identifiable manner.

In the above embodiments, in the processing of Step S107 of the virtual image display processing, an image of the front surface 30A is caused to be displayed on the rear surface 30B of the virtual image 30 of a window screen, and, for example, once the user has been able to confirm the image of the front surface 30A, the display mode of the virtual image 30 may be restored to the original state in response to a prescribed operation performed by the user.

When multiple users are each wearing the wearable terminal device 10 and viewing the same virtual image 30 (virtual image 30 of a window screen) simultaneously, the CPU 11 may acquire, via the communication unit 16, determination result information indicating whether the front surface 30A or the rear surface 30B of the virtual image 30 is easier for the other user to view from the wearable terminal device 10 used by the other user. Until the CPU 11 acquires determination result information indicating that the rear surface 30B of the virtual image 30 is easier for the other user to see from the wearable terminal device 10 used by the other user, an image of the front surface 30A of the virtual image 30 is not displayed on the rear surface 30B of the virtual image 30. If the CPU 11 determines, based on the determination result information, that the rear surface 30B of the virtual image 30 is easily seen by all of the multiple users including the user of this device 10, the CPU 11 may display an image of the front surface 30A of the virtual image 30 on the rear surface 30B of the virtual image 30. In the case where position information regarding each of the multiple users can be acquired, the CPU 11 may determine, based on the position information, that all of the multiple users have assembled at a prescribed position and may display an image of the front surface 30A of the virtual image 30 on the rear surface 30B of the virtual image 30 when necessary.

In the above embodiments, the wearable terminal device 10 causes an image of the front surface 30A to be displayed on the rear surface 30B when the rear surface 30B of the virtual image 30 is determined to be easier for the user to see according to the first, second, or third determination method described above. However, this does not necessarily mean that the virtual image 30 is in an orientation that is easy for the user to view. Therefore, the wearable terminal device 10 may change the orientation of the virtual image 30 in conjunction with causing an image of the front surface 30A to be displayed on the rear surface 30B or after causing an image of the front surface 30A to be displayed on the rear surface 30B. For example, the wearable terminal device 10 may change the orientation of the virtual image 30 so that a virtual line connecting the virtual image 30 and the user is perpendicular to the virtual image 30. The wearable terminal device 10 may also change the orientation of the virtual image 30 so that the user's line of sight is perpendicular to the virtual image 30. This will allow the user to view the information displayed on the front surface 30A of the virtual image 30 in an easy to view orientation without needing to move around to the front side of the virtual image 30 and without needing to perform an operation in order to cause an image of the front surface 30A to be displayed on the rear surface 30B of the virtual image 30.

Other specific details of the configurations and control operations described in the above embodiments can be changed as appropriate without departing from the intent of the present disclosure. The configurations and control operations described in the above embodiments can be combined as appropriate to the extent that the resulting combinations do not depart from the intent of the present disclosure.

INDUSTRIAL APPLICABILITY

The present disclosure can be used in wearable terminal devices, programs, and display methods.

REFERENCE SIGNS 1 display system
10 wearable terminal device
10a body
11 CPU (processor)
12 RAM
13 storage unit
131 program
132 virtual image data
14 display
141 visor (display member)
142 laser scanner
15 sensor unit
151 acceleration sensor
152 angular velocity sensor
153 depth sensor
154 camera 155 eye tracker (line-of-sight detector)
16 communication unit
17 bus
20 information processing apparatus
21 CPU
22 RAM
23 storage unit
231 program
24 operation display
25 communication unit
26 bus
30 virtual image
30A front surface
30B rear surface
31 function bar
32 window shape change button
33 close button
40 space
41 visible area
51 virtual line
52 pointer
U user

The invention claimed is:

1. A wearable terminal device configured to be used by being worn by a user, the wearable terminal device comprising:
at least one processor,
wherein the at least one processor
causes a display to display a virtual object at a prescribed position and orientation within a space, the virtual object having a first surface and a second surface,
determines whether the first surface or the second surface is easier for the user to see, and
when the second surface is determined to be easier to see, causes an image of the first surface of the virtual object to be displayed on the second surface of the virtual object, and
wherein the second surface is both virtually parallel and opposite to the first surface.

2. The wearable terminal device according to claim 1, wherein the display includes a display member that is transparent to light, and
the at least one processor displays the virtual object on a display surface of the display member with the virtual object visible in the space that is visible through the display member.

3. The wearable terminal device according to claim 1, further comprising:
a camera configured to capture an image of the space,
wherein the at least one processor causes the display to display an image of the space captured by the camera and the virtual object superimposed on the image of the space.

4. The wearable terminal device according to claim 1, further comprising:
a line-of-sight detector configured to detect a line of sight of the user,
wherein the at least one processor determines that the second surface is easier to see when an intersection of the line of sight detected by the line-of-sight detector and the virtual object is located on a side of the virtual object where the second surface is located.

5. The wearable terminal device according to claim 1, wherein the at least one processor
is capable of displaying a virtual line in a direction in which a hand of the user extends on the display, and
if an intersection of the virtual line and the virtual object is located on a side of the virtual object where the second surface is located, determines that the second surface is easier to see.

6. The wearable terminal device according to claim 1, wherein if the user is located on a side where the second surface is located with respect to a boundary between the first surface and the second surface, the at least one processor determines that the second surface is easier to see.

7. The wearable terminal device according to claim 6, wherein the at least one processor does not allow display of an image of the first surface of the virtual object on the second surface of the virtual object when there is an obstacle between the virtual object and the user, the user being located on a side where the second surface is located and the obstacle blocking the user's view of the virtual object.

8. The wearable terminal device according to claim 1, wherein the virtual object can be set to either of a first mode in which display of an image of the first surface of the virtual object on the second surface of the virtual object is allowed, and a second mode in which this type of display is not allowed.

9. The wearable terminal device according to claim 1, wherein the at least one processor allows display of an image of the first surface of the virtual object on the second surface of the virtual object when the virtual object is an object of a prescribed thickness or less, but does not allow display of an image of the first surface of the virtual object on the second surface of the virtual object when the virtual object is an object of a thickness exceeding the prescribed thickness.

10. The wearable terminal device according to claim 1, wherein the at least one processor acquires, from another wearable terminal device, determination result information indicating whether the first surface or second surface is easier to see for another user wearing and using the other wearable terminal device, and
when the user and the other user view the same virtual object at the same time, display of an image of the first surface of the virtual object on the second surface of the virtual object is not allowed until the determination result information indicating that the second surface of the virtual object is easier for the other user to see is acquired.

11. The wearable terminal device according to claim 1, wherein the at least one processor does not allow display of an image of the first surface of the virtual object on the second surface of the virtual object when the virtual object is located at a position within a prescribed distance from a wall in a real space.

12. The wearable terminal device according to claim 1, wherein the image displayed on the second surface of the virtual object is the same as the image of the first surface.

13. A non-transitory computer-readable storage medium storing a program configured to cause a computer provided in a wearable terminal device configured to be used by being worn by a user to:
cause a display to display a virtual object at a prescribed position and orientation within a space, the virtual object having a first surface and a second surface,
determine whether the first surface or the second surface is easier for the user to see, and when the second surface is determined to be easier to see, cause an image of the first surface of the virtual object to be displayed on the second surface of the virtual object, wherein the second surface is both virtually parallel and opposite to the first surface.

14. A display method for use in a wearable terminal device configured to be used by being worn by a user, the method comprising:

causing a display to display a virtual object at a prescribed position and orientation within a space, the virtual object having a first surface and a second surface, determining whether the first surface or the second surface is easier for the user to see, and when the second surface is determined to be easier to see, causing an image of the first surface of the virtual object to be displayed on the second surface of the virtual object, wherein the second surface is both virtually parallel and opposite to the first surface.

* * * * *